(12) United States Patent
Zheng et al.

(10) Patent No.: US 11,953,405 B2
(45) Date of Patent: Apr. 9, 2024

(54) TRACER PARTICLE SPREADING DEVICE FOR A BOUNDARY LAYER FLOW VISUALIZATION EXPERIMENT BASED ON A FLAT PLATE

(71) Applicant: ZHEJIANG UNIVERSITY, Zhejiang (CN)

(72) Inventors: Yao Zheng, Zhejiang (CN); Zhixian Ye, Zhejiang (CN); Jianfeng Zou, Zhejiang (CN); Yang Zhang, Zhejiang (CN); Yiyang Jiang, Zhejiang (CN); Zenan Tian, Zhejiang (CN); Shaochang Mo, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 388 days.

(21) Appl. No.: 17/606,690

(22) PCT Filed: Jul. 2, 2020

(86) PCT No.: PCT/CN2020/099922
§ 371 (c)(1),
(2) Date: Oct. 26, 2021

(87) PCT Pub. No.: WO2021/036501
PCT Pub. Date: Mar. 4, 2021

(65) Prior Publication Data
US 2022/0214245 A1    Jul. 7, 2022

(30) Foreign Application Priority Data
Aug. 29, 2019   (CN) .......................... 201910808906.9

(51) Int. Cl.
*G01M 9/04* (2006.01)
*F04D 19/00* (2006.01)
*F04D 27/00* (2006.01)

(52) U.S. Cl.
CPC ............. *G01M 9/04* (2013.01); *F04D 19/002* (2013.01); *F04D 27/004* (2013.01)

(58) Field of Classification Search
CPC ...... F04D 19/002; F04D 27/004; G01M 9/04; G01M 9/067
See application file for complete search history.

(56) References Cited

U.S. PATENT DOCUMENTS 10,267,762 B2 *   4/2019   Hino .................. G01N 33/0037

FOREIGN PATENT DOCUMENTS

| CN | 201037868 Y | 3/2008 |
| CN | 101912752 A | 12/2010 |

(Continued)

*Primary Examiner* — Andre J Allen
(74) *Attorney, Agent, or Firm* — Young Basile Hanlon & MacFarlane, P.C.

(57) ABSTRACT

A tracer particle spreading device for a boundary layer flow visualization experiment based on a flat plate includes a tracer particle generator, a smoke storage box, and a wall-surface particle distribution box. Fume and oil are pressurized by a micro pump and flows into a heating pipe to be heated and vaporized, and then is ejected from a nozzle to form tracer particles. The tracer particles enter the smoke storage box via a smoke guiding tube. An axial flow fan is mounted on a wall surface of the smoke storage box. The tracer particles enter a cavity of the wall-surface particle distribution box via the smoke guiding tube, and the tracer particles are rectified by a rectifying plate and ejected from a spreading slit. An outlet of the spreading slit is at an angle of 15° with respect to an experiment flat plate.

5 Claims, 1 Drawing Sheet

(56) References Cited

FOREIGN PATENT DOCUMENTS

| | | | | | |
|---|---|---|---|---|---|
| CN | 102435769 | A | * | 5/2012 | |
| CN | 102853990 | A | | 1/2013 | |
| CN | 203324298 | U | | 12/2013 | |
| CN | 108519213 | A | | 9/2018 | |
| CN | 108627673 | A | | 10/2018 | |
| CN | 208795453 | U | | 4/2019 | |
| CN | 110411710 | A | | 11/2019 | |
| CN | 109870288 | B | * | 9/2020 | |
| CN | 108627673 | B | * | 3/2021 | ................ G01P 5/20 |
| CN | 114838912 | A | * | 8/2022 | |
| CN | 115824560 | A | * | 3/2023 | |
| JP | H0472538 | A | | 3/1992 | |
| JP | H10332528 | A | | 12/1998 | |

\* cited by examiner

TRACER PARTICLE SPREADING DEVICE FOR A BOUNDARY LAYER FLOW VISUALIZATION EXPERIMENT BASED ON A FLAT PLATE

CROSS REFERENCE TO RELATED APPLICATION

This application is a national stage application of International Patent Application No. PCT/CN2020/099922, filed on Jul. 2, 2020, which claims priority of the Chinese Patent Application No. 201910808906.9, filed on Aug. 29, 2019, both of which are incorporated by references in their entities.

TECHNICAL FIELD

The present disclosure relates to a tracer particle spreading device for a boundary layer flow visualization experiment based on a flat plate, and belongs to the field of near-wall area flow measurement in experimental fluid mechanics.

BACKGROUND

In experimental fluid mechanics, a flow field in a near-wall area of a boundary layer is measured by traditional measurement methods, such as a pressure measurement rakes and hot wire anemometer, which can only perform a single-point measurement and cannot observe the whole of a flow field of an entire test area. These methods are contact measurements, and a probe needs to be placed inside the boundary layer, which interferes with a flow in the near-wall area and affect an accuracy of measurement results. With the development of image acquisition and processing technologies, through a flow visualization experiment on a flow field of the boundary layer, flow field information of a near-wall area can be directly obtained without contact, which greatly improves a convenience of the experiment. The specific information of the flow field with high accuracy, such as a velocity vector, a vortex and a turbulence structure, can be obtained by processing captured images. For a flow visualization of a near-wall area of the flat plate in an open jet wind tunnel, a conventional method directly spreads the tracer particles in an upstream incoming flow of an experiment section. Due to a hysteresis action of a wall surface and a lack of sufficient momentum exchange between a flow inside the boundary layer and a mainstream of the incoming flow, there is a problem that it is difficult for the tracer particles to uniformly enter the near-wall area, resulting in the limitation of related flow visualization shooting.

SUMMARY

The embodiments of the present disclosure provide a tracer particle spreading device for a boundary layer flow visualization experiment based on a flat plate, and the technical solutions are as follows:

A tracer particle spreading device for flow visualization experiment based on a flat plate, comprising a tracer particle generator, smoke guiding tubes, a smoke storage box and a wall-surface particle distribution box.

The tracer particle generator includes a fume and oil storage tank, a micro pump, a heating tube and a nozzle connected together in sequence. Fume and oil are pressurized by the micro pump, the pressurized fume and oil flow into the heating tube to be heated and vaporized, then a smoke is ejected through the nozzle to form tracer particles. The nozzle of the tracer particle generator is connected to the smoke storage box via the smoke guiding tubes.

The smoke storage box is configured for adjusting a flow speed of the particles.

The wall-surface particle distribution box includes a cavity, a rectifier plate mounted at a middle part of the cavity, and a thin wall cover plate provided at an upper part of the cavity and provided with particle spreading slits through which the particles escape; an outlet of the smoke storage box is connected to a lower part of the cavity via the smoke guiding tubes.

In some embodiments, an axial flow fan is mounted in an inner wall surface of the fume storage tank, and the flow speed of the particles is adjusted by a rotation speed of the axial flow fan.

In some embodiments, the cavity of the wall-surface particle distribution box is formed by assembling acrylic plates. A lower end of the cavity is an interface for the smoke guiding tubes, through which the tracer particles enter. The rectifier plate in a honeycomb shape is mounted in the cavity. The thin wall cover plate is provided with particle spreading slits, and axes of outlets of the particle spreading slits form an angle of 15° with respect to a surface of the thin wall cover plate.

In some embodiments, the wall-surface particle distribution box is installed such that an upper surface of the thin wall cover plate of the wall-surface particle distribution box is coplanar with an experiment flat plate.

In the device of the present disclosure, the axes of outlets of the particle spreading slits forms an angle of 15° with respect to the experiment flat plate. The tracer particles can be evenly spread in the near-wall area of the boundary layer for flat plate at a common experimental wind speed of 15-30 m/s. The device has a simple structure, and solves the problem that the tracer particles spreading from an entrance of an experiment section of the wind tunnel cannot enter into the boundary layer for the flat plate. The device provides a good technical support for performing the boundary layer flow visualization experiment based on flat plate and its mechanism study.

BRIEF DESCRIPTION OF THE DRAWINGS

In order to more clearly illustrate the embodiments of the disclosure or the technical schemes in the prior art, the drawings required in the embodiments or in the prior art will be briefly described below. Apparently, the drawings in the following description are only some embodiments of the disclosure, for those skilled in the art, other drawings can be obtained according to the drawings without paying creative labors.

Figure 1:
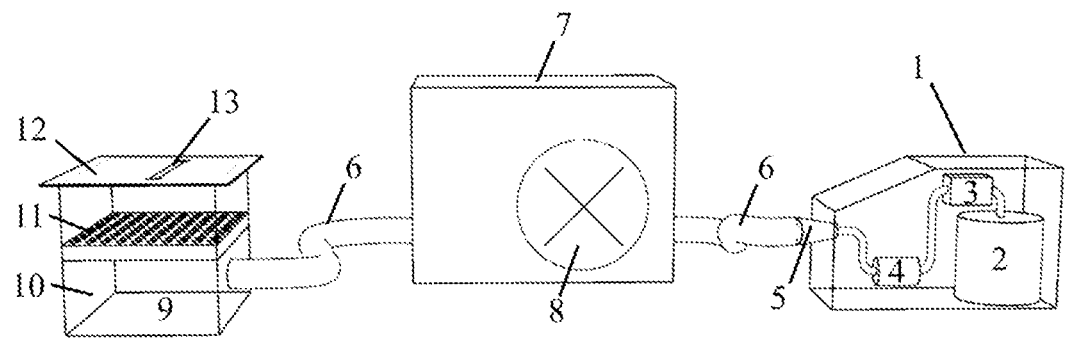
FIG. 1 is a structural schematic view of a tracer particle spreading device for a boundary layer flow visualization experiment based on a flat plate according to the present disclosure.
Figure 2:
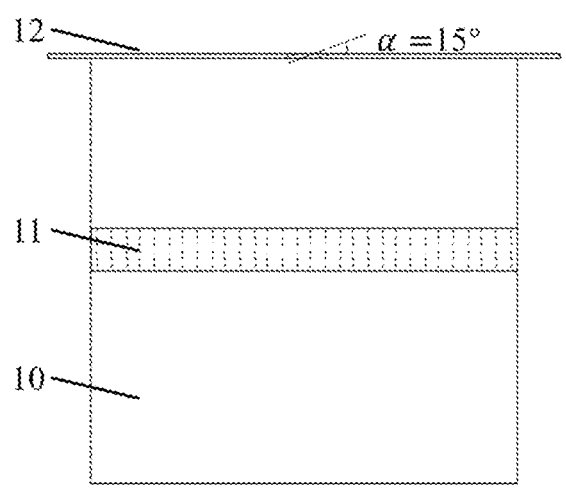
FIG. 2 is a structural schematic view of a wall-surface particle distribution box according to the present disclosure.
Figure 3:
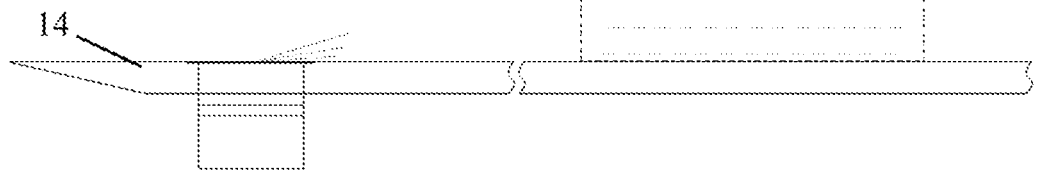
FIG. 3 is a schematic view of device arrangement in the boundary layer flow visualization experiment based on the flat plate according to the present disclosure.

List of reference numerals in FIGS. 1-3: 1 tracer particle generator, 2 fume and oil storage tank, 3 micro pump, 4 heating tube, 5 nozzle, 6 smoke guiding tube, 7 smoke storage box, 8 axial flow fan, 9 wall-surface particle distribution box, 10 cavity, 11 rectifier plate, 12 thin wall cover plate, 13 particle spreading slit, 14 experiment flat plate.

DETAILED DESCRIPTION

The technical schemes in the embodiments of the present disclosure will be clearly and completely described below by combining with the accompanying drawings in the embodiments of the present disclosure, and apparently the embodiments described are only a part of the embodiments of the present disclosure, and not all of them. All other embodiments, which are obtained by a person skilled in the art based on the embodiments of the present disclosure without paying creative labors, shall fall within the protection scope of the present disclosure.

A tracer particle spreading device for a boundary layer flow visualization experiment based on a flat plate is disclosed by the present disclosure. The device is configured for uniformly distributing tracer particles required for the flow visualization experiment into a boundary layer in an experiment flat-plate near-wall area, and is suitable for a case where high-concentration particles cannot spread throughout a whole experimental area.

Referring to FIG. 1, the tracer particle spreading device for the boundary layer flow visualization experiment based on the flat plate includes a tracer particle generator 1, a smoke storage box 7 and a wall-surface particle distribution box 9 connected together in sequence, via smoke guiding tubes 6.

The tracer particle generator 1 includes a fume and oil storage tank 2, a micro pump 3, a heating tube 4 and a nozzle 5.

A sufficient amount of fume and oil is filled to the fume and oil storage tank 2. The heating tube 4 is preheated and then the micro pump 3 is actuated so that the fume and oil flow into the heating tube 4 and are heated and vaporized. The heated and vaporized fume and oil are ejected from the nozzle 5 to form smoke, as the tracer particles for the experiment.

The tracer particles enter the smoke storage box 7 through the smoke guiding tubes 6.

An axial flow fan 8 arranged on a wall surface of the smoke storage box 7 is actuated to accelerate the flow of the tracer particles in the smoke storage box 7, so as to avoid condensation of the smoke in the guiding tubes and the smoke storage box, due to a low flow rate of the smoke.

The tracer particles enter the wall-surface particle distribution box 9 through the fume tubes 6 from the storage box 7.

The wall-surface particle distribution box 9 includes a cavity 10, a rectifier plate 11 and a thin wall cover plate 12.

The cavity 10 is formed by assembling acrylic plates, a lower end of the cavity is provided with an interface for the smoke guiding tubes, through which the tracer particles enter, and the rectifier plate 11 in a honeycomb shape is mounted at a middle of the cavity to rectify and buffer a movement of the tracer particles, thereby reducing an influence of a movement speed of the tracer particles on a flow field in a subsequent experiment.

The thin wall cover plate 12 is mounted on an upper end of the distribution box, and is provided with particle spreading slits 13. An axis of each particle spreading slit forms an angle of 15° with respect to the thin wall cover plate. The tracer particles evenly escape from the particle spreading slit 13 to flow downstream in a main flow direction along a wall surface of the flat plate, so as to form a tracer particle layer close to the near-wall area of the flat plate, thereby ensuring followability of the tracer particles and reducing an interference of an inflow of the tracer particles on the flow field of a tested area.

After a uniform tracer particle field is formed in an observation area of the flow visualization experiment, movements of the tracer particles in the near-wall area of the flat plate can be captured by a high speed camera, and specific information such as a velocity vector, a vortex and a turbulence structure of the flow field can be obtained by processing the captured images.

When the tracer particle spreading device for flow visualization experiment is used, the wall-surface particle distribution box is mounted in front of the experiment flat plate 14, and an upper surface of the thin wall cover plate of the wall-surface particle distribution box is coplanar with the experiment flat plate. Other parts, except for parts mounted inside the wind tunnel, of the wall-surface particle distribution box can be placed outside a wind tunnel test section, and the tracer particles are delivered via the smoke guiding tubes.

The technical solutions provided by the present disclosure are described in detail above. The principles and implementations of the present disclosure are described herein by applying specific examples, and the description of the above embodiments is merely used to help understanding the method and core ideas of the present disclosure. It should be pointed out that, for a person of ordinary skill in the art, several improvements and modifications can be made to the present disclosure without departing from the principle of the present disclosure, and these improvements and modifications also belong to the protection scope of the claims of the present disclosure.

What is claimed is:

1. A tracer particle spreading device for a boundary layer flow visualization experiment based on a flat plate, the tracer particle spreading device comprising a tracer particle generator, smoke guiding tubes, a smoke storage box and a wall-surface particle distribution box, wherein:
   the tracer particle generator comprises a fume and oil storage tank, a micro pump, a heating tube and a nozzle connected together in sequence;
   the nozzle of the tracer particle generator is connected to the smoke storage box via the smoke guiding tubes;
   the smoke storage box is configured for adjusting a flow speed of particles;
   the wall-surface particle distribution box comprises a cavity, a rectifier plate mounted at a middle part of the cavity, and a thin wall cover plate provided at an upper part of the cavity and provided with particle spreading slits through which the particles escape; and
   an outlet of the smoke storage box is connected to a lower part of the cavity via the smoke guiding tubes.

2. The tracer particle spreading device according to claim 1, wherein an axial flow fan is mounted in an inner wall surface of the fume storage tank, and the flow speed of the particles is adjusted by a rotation speed of the axial flow fan.

3. The tracer particle spreading device according to claim 1, wherein the rectifier plate is in a honeycomb shape.

4. The tracer particle spreading device according to claim 1, wherein the thin wall cover plate is provided with particle spreading slits, and axes of outlets of the particle spreading slits form an angle of 15° with respect to a surface of the thin wall cover plate.

5. The tracer particle spreading device according to claim 1, wherein the wall-surface particle distribution box is installed such that an upper surface of the thin wall cover plate of the wall-surface particle distribution box is coplanar with an experiment flat plate.

\* \* \* \* \*